United States Patent [19]

Colas

[11] Patent Number: 4,625,492

[45] Date of Patent: Dec. 2, 1986

[54] DEVICE FOR PACKING AND IN VACUO PRESERVING, IN A PLASTIC WRAPPING, PRODUCTS STERILIZED IN AN AUTOCLAVE

[75] Inventor: Christian Colas, Neuilly sur Seine, France

[73] Assignee: MAJ, Pantin, France

[21] Appl. No.: 724,346

[22] Filed: Apr. 18, 1985

[30] Foreign Application Priority Data

Apr. 27, 1984 [FR] France ................................. 84 06672

[51] Int. Cl.$^4$ ............................................ B65B 31/02
[52] U.S. Cl. ................................ 53/373; 53/DIG. 2; 493/209; 156/510
[58] Field of Search .................... 53/373, DIG. 2, 479, 53/477; 493/209; 156/510

[56] References Cited

U.S. PATENT DOCUMENTS

| | | | |
|---|---|---|---|
| 2,820,403 | 1/1958 | Plough et al. .................. | 493/171 X |
| 2,865,152 | 12/1958 | Windstrup et al. ............... | 53/373 X |
| 3,509,686 | 5/1970 | Bergstrom . | |
| 3,965,333 | 6/1976 | Elsner ............................. | 493/209 X |
| 4,242,852 | 1/1981 | Orliaguet et al. . | |
| 4,490,961 | 1/1985 | Raque ............................. | 53/373 X |

FOREIGN PATENT DOCUMENTS 1601184 12/1968 France .
2419883 3/1978 France .

Primary Examiner—James F. Coan

Attorney, Agent, or Firm—Amster, Rothstein & Ebenstein

[57] ABSTRACT

The device comprises a support rack having a plurality of trays for supporting in a horizontal position air-impermeable plastic bags containing the products to be sterilized, each bag having an open end which is engaged through one of a plurality of vertically spaced horizontal slits in a vertical face of the support rack, each slit being defined by a pair of sealing bars comprising a fixed bar and a movable bar which can be moved into engagement with the fixed bar to compress and seal the open end of the plastic bag, the movable bar of each pair of sealing bars being actuated by a linear actuator having a direction of movement which is parallel to the longitudinal direction of the sealing bars, and by a conversion mechanism which is arranged for converting the direction of movement of the linear actuator into a movement orientated perpendicularly to the longitudinal direction of the sealing bars and which acts on the movable sealing bar at two longitudinally spaced points thereof, the arrangement being such that the stroke of the movable sealing bar is at least 5 mm, the conversion mechanism comprising a control bar coupled to the linear actuator, a pair of ramp-shaped cams and a pair of rollers coacting with the cams, respectively, the cams being carried by one of the movable sealing bar and control bar, the rollers being carried by the other of the movable sealing bar and control bar, and the control bar extending between the movable sealing bar of one pair of sealing bars and the fixed bar of an adjacent pair of sealing bars, other rollers being provided between the control bar and the adjacent fixed sealing bar.

3 Claims, 7 Drawing Figures

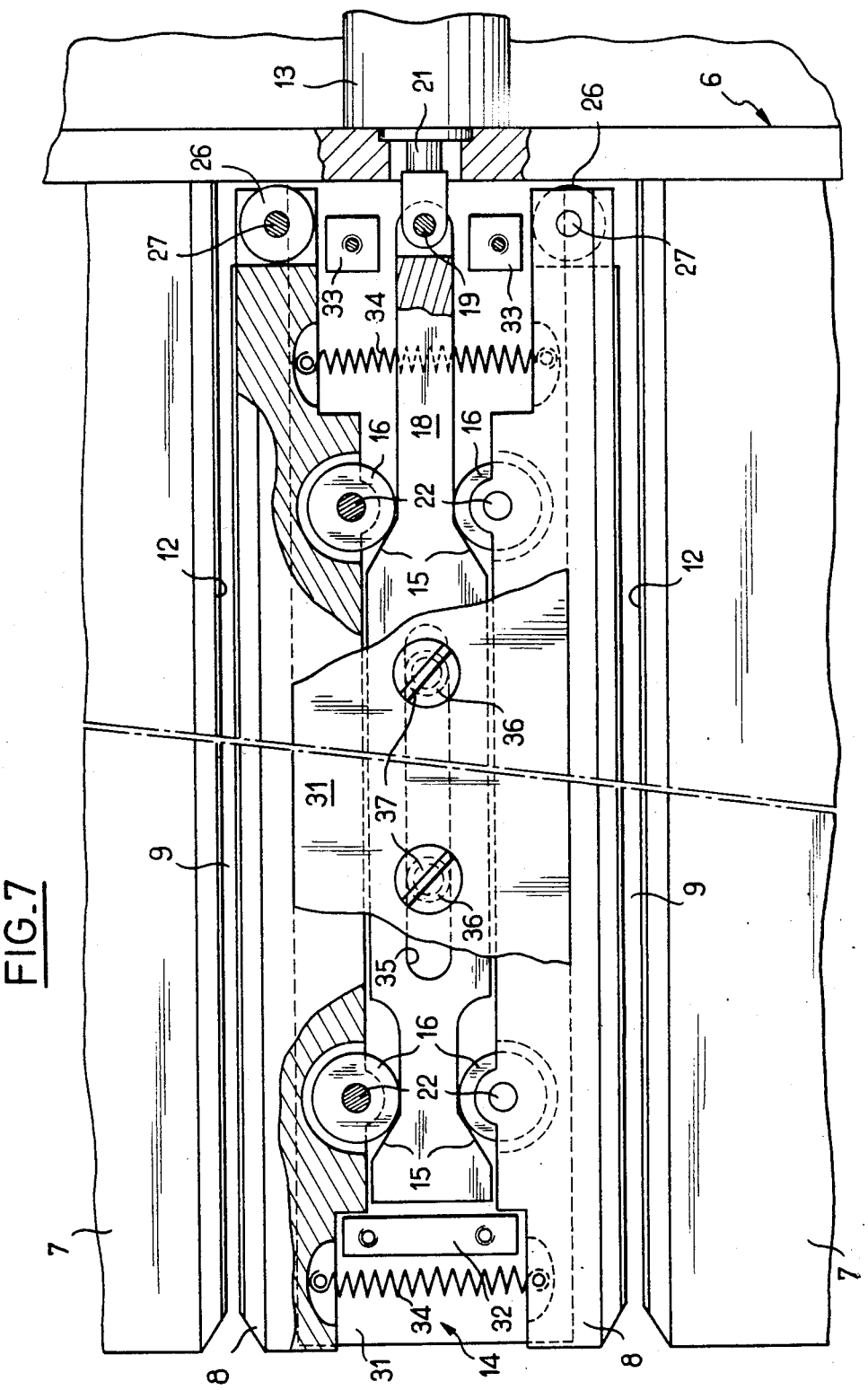

DEVICE FOR PACKING AND IN VACUO PRESERVING, IN A PLASTIC WRAPPING, PRODUCTS STERILIZED IN AN AUTOCLAVE

FIELD OF THE INVENTION

The present invention relates to a device for packing and in vacuo preserving, in a plastic wrapping, products, more especially linen, sterilized in an autoclave, of the type comprising a supporting rack one at least of the vertical faces of which has vertically spaced horizontal slits, means for supporting plastic air impermeable bags in a horizontal position inside the supporting rack, each bag having an open end which passes through one of the horizontal slits in the supporting rack and compression and sealing means associated with the slits for sealing the open ends of the bags, each compression and sealing means comprising a pair of horizontal parallel bars which define therebetween one of said slits and one at least of which is movable with respect to the other, and an actuating means for moving the movable bar between a first position in which the two bars of each pair are spaced from each other and a second position in which the two bars of each pair are pressed one against the other.

BACKGROUND OF THE INVENTION

A device of this type is already known from French Pat. No. 2,419,883 (U.S. Pat. No. 4,242,852) to the same assignee. With respect to the device described in U.S. Pat. No. 3,925,961 to the same assignee the device described in French Pat. No. 2,419,883 sought to:
1. Increase the productivity of the equipment by reducing the waiting time between two consecutive sterilizing cycles in the autoclave;
2. Provide a less complex and less fragile system from the mechanical point of view, taking into account the harsh conditions which prevail in an autoclave;
3. Allow horizontal loading of the bags so as to prevent them from collapsing and being deformed in the autoclave under the effect of the heat and their own weight.

In French Pat. No. 2,419,883, the actuating means associated with the movable bars of the compression and sealing means are formed by inflatable seals. Inflatable seals have several advantages. They allow a uniform pressure to be obtained over the whole length of the bars of the compression and sealing means, which is one of the essential conditions for obtaining correct sealing of the bags and for insuring that the products contained therein will remain sterile until the time when they are used. Furthermore, inflatable seals require little space in height, so that they may be disposed between two pairs of compression and sealing bars. The result is that, for a rack of a given height, it is possible to process simultaneously a large number of bags disposed horizontally and stacked on top of each other, thus contributing to increase the productivity of the packing and sterilizing device.

However, inflatable seals capable of withstanding the harsh conditions which prevail in an autoclave, do not allow both a long stroke of the movable bars of the compression sealing means and a high sealing pressure to be obtained at the same time, this latter being also an essential condition for obtaining correct sealing. By way of indication, the inflatable seals used in the device described in French Pat. No. 2,419,883 only allowed a short stroke of said movable bars of about 2 mm so that the slit formed between each pair of bars only has small width. In use, this has proved to have several drawbacks. In fact, before sterilizing, the plastic bags are relatively soft, so that it is difficult to introduce their open ends into the slits of such a small width. In addition, the small width of the slits hinders the penetration of vapor into the bags and evacuation thereof. This leads to a lower sterilizing safety and involves consequently a longer sterilizing time so as to be sure that correct sterilization has been obtained. It follows that the total time for the packing and sterilizing cycle is longer, which adversely affects the productivity of the packing and sterilizing device.

DESCRIPTION OF THE INVENTION

The purpose of the present invention is therefore to provide, in a packing and sterilizing device of the above mentioned type, an actuating means allowing a longer stroke of the movable bar of each pair of bars to be obtained than with an inflatable seal, while providing a uniform pressure over the whole length of the bars and which may be housed between two pairs of bars without substantially increasing the vertical distance between two pairs of bars and, consequently, without reducing the number of bags which it is possible to dispose horizontally above each other in a rack of a given height.

For this, in the packing and preserving device of the present invention, said actuating means comprise a linear actuator the direction of movement of which is parallel to the longitudinal direction of the horizontal slits, and a conversion mechanism adapted for converting the direction of movement of the linear actuator into a movement orientated perpendicularly to the longitudinal direction of the slits, and which acts at two longitudinally spaced points on the movable bar, the arrangement being such that the stroke of the movable bar between its first and second positions is at least five millimeters.

BRIEF DESCRIPTION OF DRAWINGS

The invention will now be described with reference to the accompanying drawings in which:

FIG. 7 is a view similar to FIG. 2 showing another embodiment of the present invention.

DESCRIPTION OF THE EMBODIMENTS OF THE INVENTION

Figure 1:
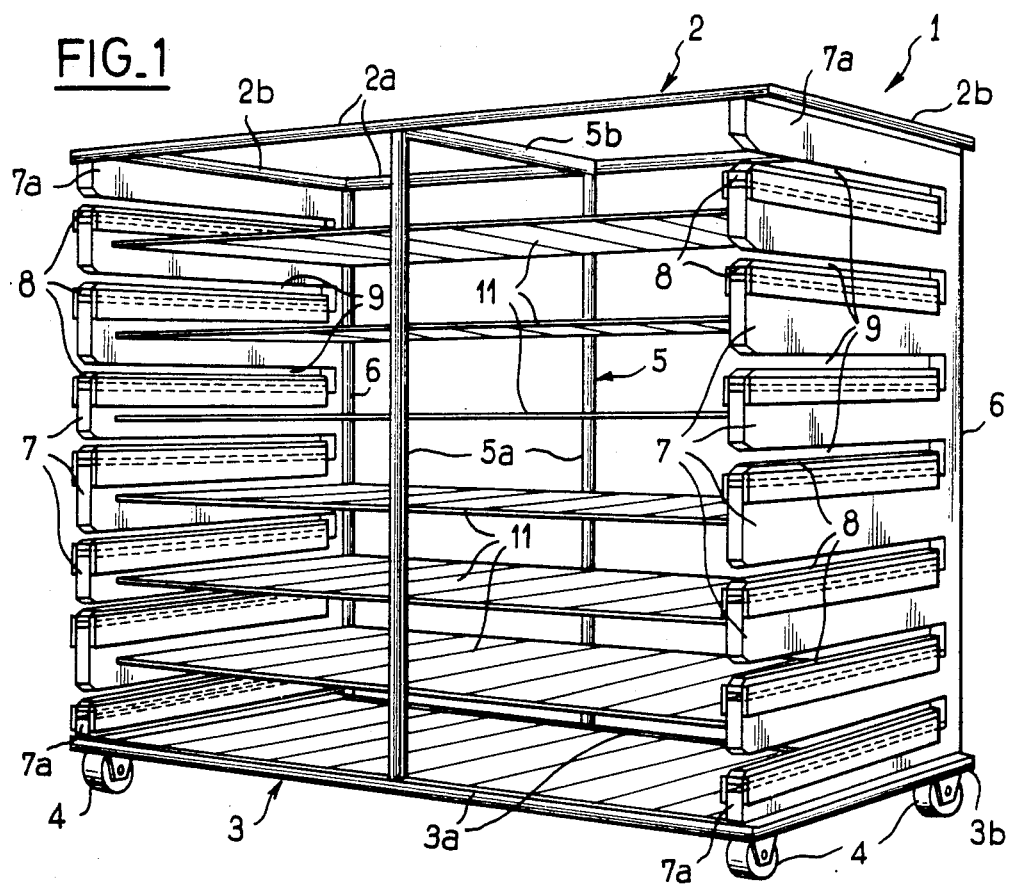
FIG. 1 is a perspective view of a support rack in accordance with the present invention.
Figure 4:
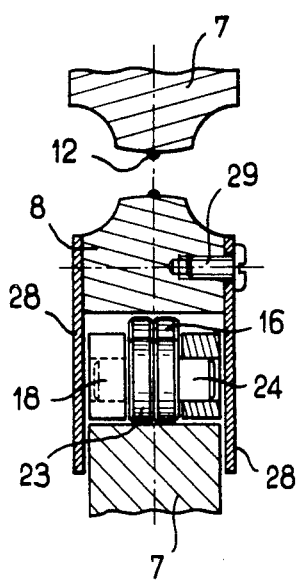
Figure 5:
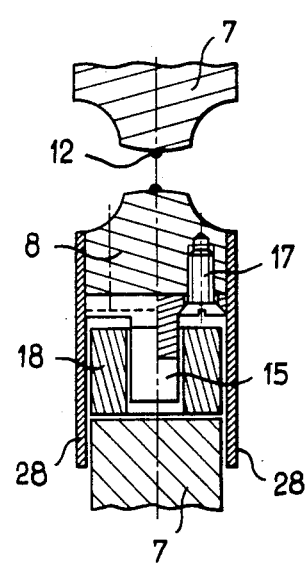
Figure 6:
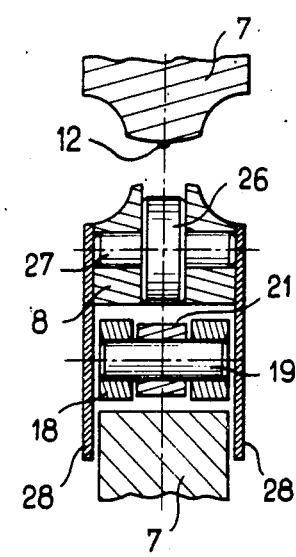

The support rack 1 shown in FIG. 1 has substantially a parallelepipedic shape. It has a framework comprising an upper horizontal rectangular frame 2, a lower horizontal rectangular frame 3, provided with wheels 4 for facilitating insertion of the support rack 1 in an autoclave (not shown), a rectangular vertical frame 5 and two vertical corner uprights 6. Each of the two frames 2 and 3 comprises two longitudinal side members 2a and 3a, respectively, and two transverse side members 2b and 3b, respectively. Frame 5 is formed from two vertical uprights 5a and two horizontal transverse members 5b which brace the longitudinal side members 2a and 3a of frames 2 and 3 at the middle thereof. The side members of frames 2, 3 and 5 and uprights 6 may for example be formed by angle irons or channel sections.

To each of the two uprights 6 are fixed, by one of their ends, horizontal parallel bars 7 the endmost bars 7a being also fixed to the side members 2b and 3b of frames 2 and 3. With each bar 7 or 7a is associated a horizontal bar 8, which is parallel to the corresponding bar 7 and which defines therewith a slit 9 open at one end, i.e. at the end opposite the upright 6.

Inside the support rack 1 are disposed trays 11 which are supported at both ends by the fixed bars 7 and, in the middle, by the uprights 5a of frame 5. So as to make the support rack 1 more rigid, trays 11 may be fixed rigidly to bars 7 and to uprights 5a. Trays 11 are provided for supporting, in the horizontal position, bags, (not shown) made from a plastic air impermeable material, containing the products, for example linen, to be sterilized. Each bag has an open end which may be engaged in one of the slits 9.

For sealing the bags at the end of a sterilizing cycle, each bar 8 may be pressed against the fixed bar 7 or 7a associated therewith by an actuating device which will be described hereafter. In addition, at least one of the two bars 7 and 8 of each pair of associated bars, for example bar 7, comprises a sealing member 12 (FIGS. 2 and 4 to 6) which extends substantially over the whole length of bar 7 in the slit 9. Each sealing member 12 may for example be formed by an electric heating resistance mounted in a known manner in an insulating support which is fixed rigidly to bar 7. The electric heating resistances are supplied with power in a known manner by means of conductors connected to a supply circuit (not shown) which is common to all the electric heating resistances and which is supported by the support rack 1. This power supply circuit may be itself connected, through a flexible supply cable, to a power plug situated inside the autoclave once the support rack 1 has been introduced into said autoclave.

As already mentioned above, each bar 8 may be moved and pressed against the fixed bar 7 associated therewith by an actuating device which will now be described with reference to FIGS. 2 to 6. The actuating device comprises essentially a linear actuator 13 the direction of movement of which is parallel to the longitudinal direction of slit 9, and a conversion mechanism 14 adapted for converting the direction of movement of the linear actuator 13 into a movement which is perpendicular to the longitudinal direction of slit 9. In order to obtain uniform pressure over the whole length of slit 9, the conversion mechanism 14 acts at two longitudinally spaced points on bar 8. As shown more clearly in FIGS. 2 and 3, the conversion mechanism 14 comprises two cams 15, in the shape of a ramp, which are situated respectively close to the ends of the movable bar 8, and two rollers 16 which are associated respectively with cams 15. As can be seen more clearly in FIGS. 2 and 5, cams 15 are fixed by screws 17 to the movable bar 8, whereas rollers 16 are supported by a control bar 18 which extends horizontally between the movable bar 8 and the underlying fixed bar 7 of another pair of horizontal parallel bars 7 and 8 and which is coupled by a pin 19 to the control member 21 of the linear actuator 13. As can be seen more clearly in FIG. 3, each of the two ends of the control bar 18 are in the form of a fork between the two legs of which one of the two rollers 16 is mounted for rotation by means of an axis 22. Two other rollers 23 (FIGS. 2 to 4) are also mounted for rotation on axes 24 at both ends of the control bar 18, respectively, and allow this latter to roll over the upper face of the underlying fixed bar 7.

Figure 2:
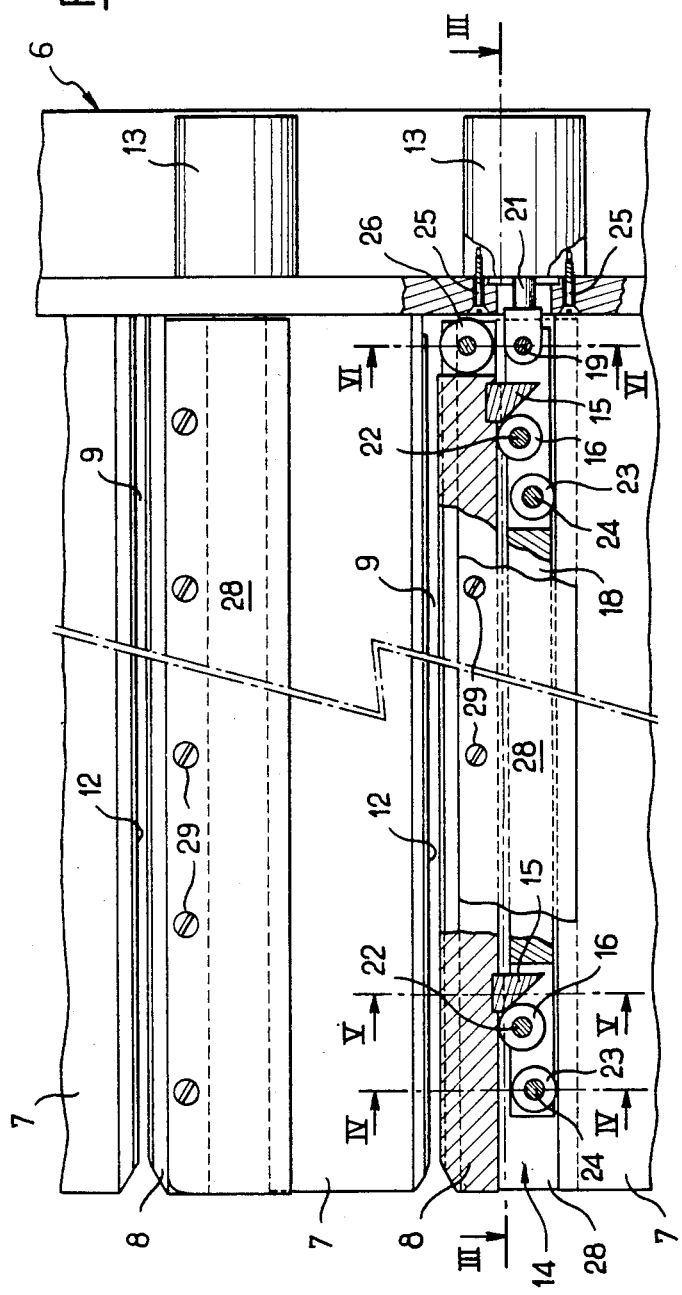
FIG. 2 is a side elevational view showing, with parts cut away, a portion of one of the vertical side walls of the support rack of FIG. 1, FIGS. 3, 4, 5 and 6 are sectional views respectively through lines III—III, IV—IV, V—V and VI—VI of FIG. 2.
Figure 3:
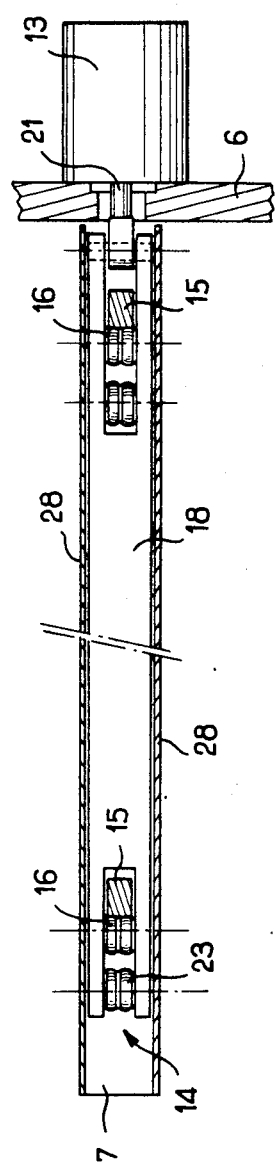

As shown in FIG. 2, the linear actuator 13 is fixed to the upright 6 by screws 25. Although the linear actuator 13 could be formed by a pneumatic or hydraulic cylinder, it is preferably formed by an electromagnet. In fact, in this case, a single source of power may be provided for operating the electric heating resistances 12 and the linear actuators 13. This represents an appreciable simplification in so far as the equipment is concerned with respect to the device as described in French Pat. No. 2,419,883 and in U.S. Pat. No. 3,925,961, since there is no longer need to provide a pressurized fluid source. Furthermore, since it is no longer necessary to feed a pressurized fluid into the chamber of the sterilizer, the risks of sealing failure are reduced. In this respect, it will be recalled that, during the sterilizing cycle, the chamber of the autoclave is evacuated and that any lack of continuity in the walls of the chamber of the autoclave, more especially for supplying therein any hydraulic, pneumatic or electric energy, forms a possible source of sealing failure.

When the electromagnet 13 is energized, the plunger core of the electromagnet which forms the control member 21 of the linear actuator exerts a pull on the control bar 18. The result is that the rollers 16 exert on the ramps of the two cams 15 a thrust directed perpendicularly to the surface of the ramps. The horizontal component of this thrust tends to move the movable bar 8 towards upright 6. This is prevented by a roller 26 mounted for rotation on an axis 27 at the end of bar 8 which is adjacent upright 6. The vertical component of the above mentioned thrust causes bar 8 to move upwardly in engagement against the fixed overlying bar 7.

In the embodiment shown in FIG. 2, the ramps of cams 15 are slanted at about 45°. The result is that a given horizontal stroke of the plunger core 21 of the electromagnet 13 corresponds to a vertical stroke of the same length of the movable bar 8.

The ramps of cams 15 could of course have a slope different from 45°. With a higher slope, for a given stroke of the plunger core 21, a higher stroke of the movable bar 8 would be obtained, but with a lower pressure force against the overlying fixed bar 7. Conversely, with a smaller slope, for said given stroke of the plunger core 21, a smaller stroke of the movable bar 8 would be obtained but with a higher pressure force against the overlying fixed bar 7. The electric power of the electromagnet 13, the length of the stroke of its plunger core 21 and the slope of cams 15 are chosen so as to obtain a stroke of at least 5 mm for the movable bar 8 and a pressure of this latter against the overlying fixed bar 7 sufficient for sealing the plastic material bags.

Two plates 28 are fixed respectively on each side of the movable bar 8 by screws 29. Each pair of plates 28 extends downwardly from the corresponding movable bar 8 and partially overlaps the underlying fixed bar 7 with the sides of which plates 28 are in sliding engagement. Thus, plates 28 serve not only for protecting the conversion mechanism 14, but also for guiding the vertical movements of the movable bar 8.

In FIG. 7 has been shown another embodiment of the present invention in which the elements which are identical to or which play the same role as in the preceding embodiment are designated by the same reference numerals and will not be described again in detail. The embodiment shown in FIG. 7 differs from that shown in FIGS. 2 to 6 in that each control bar 18 is disposed between two movable bars 8 belonging respectively to two adjacent pairs of horizontal parallel bars. Thus, each control bar 18 may simultaneously actuate two movable bars 8. Each movable bar 8 may be associated with a fixed bar 7 for forming therebetween a slit 9 as shown in FIG. 7, or it could be associated with another movable bar 8 to form the slit 9.

The two movable bars 8 and the control bar 18 associated therewith are mounted between two parallel vertical plates 31, having an elongate rectangular shape, which are fixed at least at one end to upright 6. Bracing struts 32 and 33 maintain between the two plates 31 a spacing just a little larger than the width of the movable bars 8. Two springs 34 are secured to the two movable bars 8 and urge these latter towards each other and towards the control bar 18. This latter comprises at least one longitudinal slit 35 which cooperates with two rollers 36 rotatively mounted on axes 37 which are carried by the two plates 31, for forcing the control bar 18 to move in the horizontal direction when the linear actuator 13 associated therewith is activated.

Another difference between the embodiment shown in FIG. 7 and that shown in FIGS. 2 to 6 resides in the fact that the rollers 16 are carried by the movable bars 8 whereas the ramp shaped cams 15 are carried by or form an integral part of the control bar 18.

It should of course be understood that the embodiments of the present invention which have been described above have been given solely by way of indication and are in no wise limiting, and that numerous modifications may be readily made by a man skilled in the art without for all that departing from the scope and spirit of the present invention. Thus, more particularly, instead of each control bar 18 being coupled to a respective linear actuator 13, all the control bars 18 situated on the same side of the support rack 1 could be coupled to a single linear actuator. Furthermore, instead of providing fixed trays 11 for supporting the plastic bags in a horizontal position inside the support rack 1, one or more auxiliary racks could also be provided which may be introduced in and removed from the support rack 1 in a way similar to that described in French Pat. No. 2,419,883.

Slits 9 are preferably open at one end and their open end is preferably bell-mouthed or outwardly flared as is clearly shown in FIGS. 2 and 7. However, if desired, slits 9 could be closed at both ends.

I claim:

1. A device for packing and in vacuo preserving, in a plastic wrapping, products, particularly linen, sterilized in an autoclave, comprising a support rack at least one of the vertical faces of which has vertically spaced horizontal slits, means for supporting air-impermeable plastic material bags in a horizontal position inside said support rack, each bag having an open end which passes through one of the horizontal slits in said support rack, and compression and sealing means associated with the slits for sealing the open ends of the bags, each compression and sealing means comprising a pair of parallel horizontal bars, which define therebetween one of said slits and which are movable and fixed, respectively, and an actuating means for moving said movable bar between a first position in which the two bars of each pair are spaced apart from each other and a second position in which the two bars of each pair are pressed against each other, said actuating means comprising a linear actuator having a direction of movement which is parallel to the longitudinal direction of said horizontal slits, and a conversion mechanism arranged for converting the direction of movement of said linear actuator into a movement orientated perpendicularly to the longitudinal direction of said slits, and which acts at two longitudinally spaced points on said movable bar, the arrangement being such that the stroke of the movable bar between the first and second positions is at least 5 mm, said conversion mechanism comprising a horizontal control bar coupled to said linear actuator, a pair of ramp-shaped cams, which are situated respectively close to the ends of said movable bar, and a pair of rollers associated respectively with said cams, one of said pairs of cams and rollers being carried by said movable bar, whereas the other pair is carried by said horizontal control bar, said horizontal control bar extending between the movable bar of one of said pairs of parallel horizontal bars and the fixed bar of an adjacent pair of parallel horizontal bars, and one of the two bars, namely the control bar and the fixed bar of the adjacent pair of parallel horizontal bars, comprising at least two longitudinally spaced rollers which engage with a horizontal rolling surface of the other one of the two bars.

2. The device as claimed in claim 1, wherein said linear actuator is fixed to a vertical upright of the support rack close to one end of said movable bar and, when it is activated, exerts on said control bar a force directed towards said vertical upright, and said movable bar comprises, at its end adjacent said upright, a roller adapted for rolling over a vertical rolling surface of said upright.

3. The device as claimed in claim 1, wherein said linear actuator is an electromagnet.

* * * * *